June 8, 1954  E. NARVESTAD ET AL  2,680,529
LOADING APPARATUS FOR USE ON VEHICLES
Filed Aug. 31, 1951  2 Sheets-Sheet 2
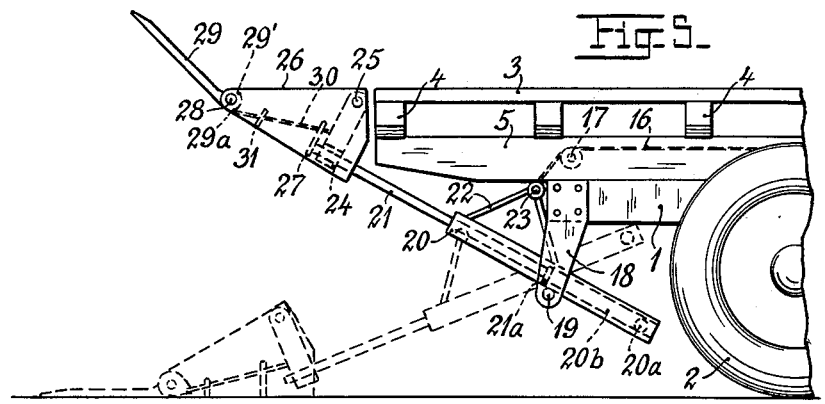
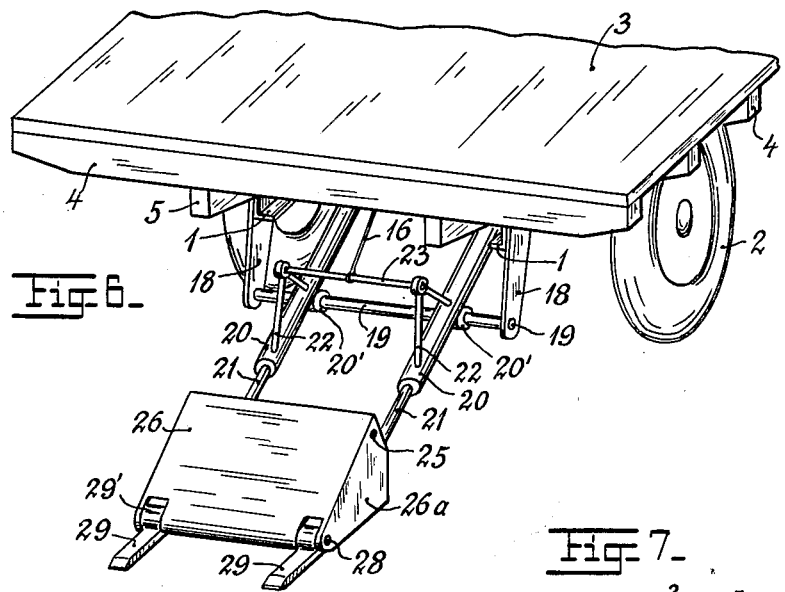
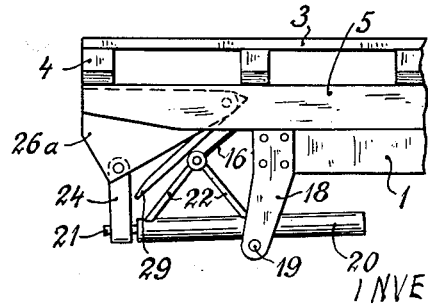
INVENTORS
ERLING NARVESTAD + ERLING JENSEN
BY Haseltine, Lake & Co.
AGENTS Patented June 8, 1954

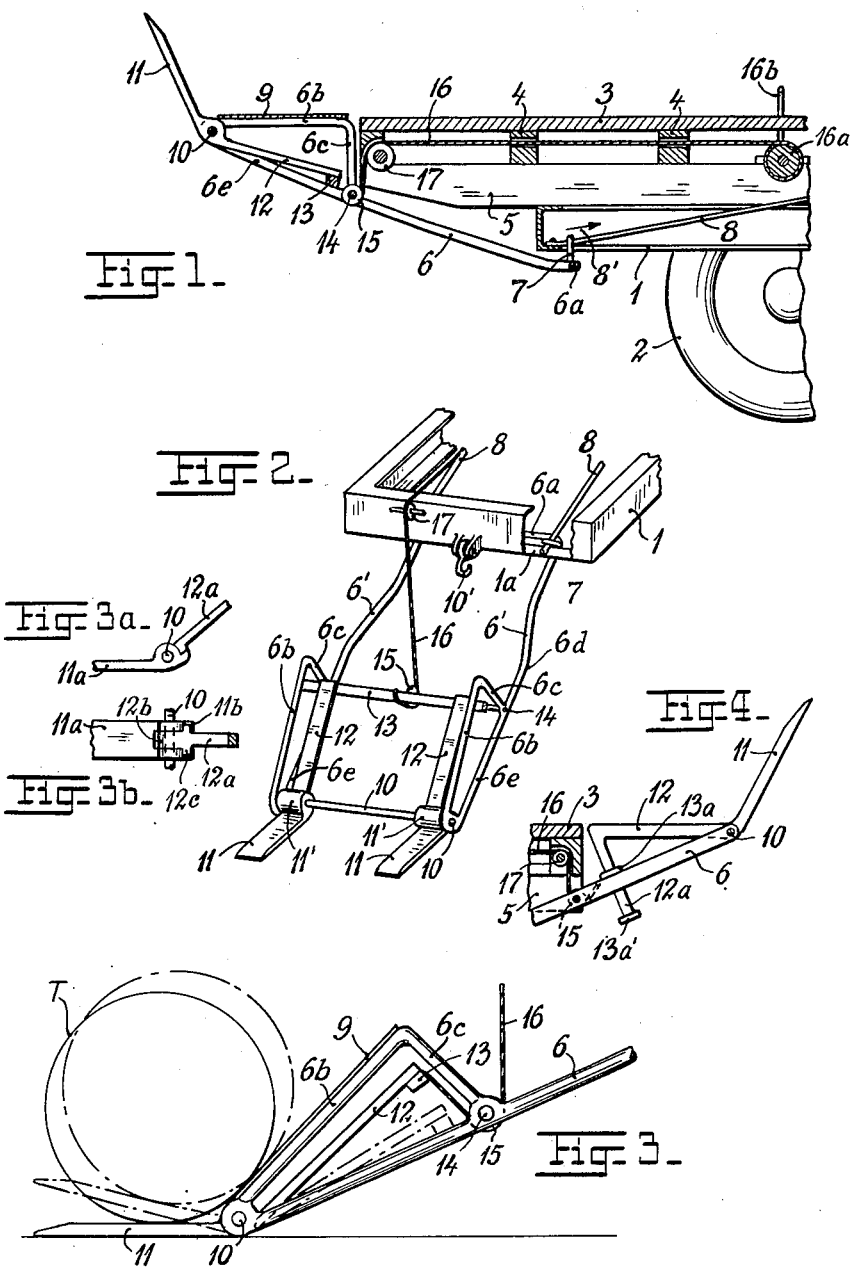

2,680,529

UNITED STATES PATENT OFFICE 2,680,529

LOADING APPARATUS FOR USE ON VEHICLES

Erling Narvestad and Erling Jensen, Oslo, Norway; said Narvestad assignor to said Jensen Application August 31, 1951, Serial No. 244,606

14 Claims. (Cl. 214—77)

This invention relates to loading apparatus for use on trucks and other goods transporting road vehicles and in particular relates to the class of loading apparatus embodying a load receiving support carried by a structure so articulated to the vehicle body that by a power or manually actuated driver the said structure can move the load receiving support into alignment with the floor of the vehicle and maintain it in such position during a loading or unloading operation, and also lower the support to a position close to the road or other surface on which the vehicle stands for the purpose of receiving or discharging a load at about road level.

An object of the invention is to provide loading apparatus for use on trucks and like road transport vehicles in which the load receiving means to be raised up to the required level with the vehicle body and lowered to the ground affords conveniently located load receiving parts for pushing or rolling loads thereon and therefrom whilst ensuring safe retention of the load during raising and lowering operations.

Another object of the invention is to provide loading apparatus suitable for handling oil drums and the like in a manner which enables the drums to be rolled on to and off from the apparatus with little manual effort and safely raised and lowered.

A further object of the invention is to provide a loading apparatus which embodies an improved form of remote control operated frame articulated to the vehicle body beneath the load receiving part of the body and carrying a load receiving support movable by upward and downward swinging of the frame relative to the vehicle body into alignment with the load receiving part of the vehicle and also with the ground, together with inner and outer load receiving sections with said support in which the said inner section can be brought into alignment with and close proximity to the load receiving part of the vehicle when the said support is raised fully, and the other section brought into substantially co-planar relationship with the ground when the load support is fully lowered, and further in which said latter section can be controlled displaceably relative to the frame automatically by the initiation of the frame-raising-drive to a driver to reduce the angle between said outer section and the frame at the commencement of the lifting of the load to prevent unintentional rolling of the load off the support.

A still further object of the invention is to provide loading apparatus which is collapsible or foldable beneath the vehicle body when out of use and which, when extended for use, is maintained in operative connection to a driver and operates to introduce automatically at the appropriate times a safety stop preventing goods rolling unintentionally therefrom during raising and lowering of the loads whilst yet avoiding the necessity of having to lift loads up from the ground on to the apparatus.

In order that the invention may be clearly understood and readily carried into effect drawings are appended hereto illustrating embodiments thereof, and wherein, Figure 1 is a longitudinal sectional elevation of the rear part of a truck showing one form of the loading and unloading apparatus in the raised position.

Figure 2 is a detail broken rear perspective view showing the apparatus of Figure 1 in the lowered position.

Figure 3 is a broken detail side elevation to a larger scale showing the loading of a drum at road level on to the platform of the apparatus.

Figures 3a and 3b are broken detail side elevation and plan views respectively showing a manner of collapsing or folding part of the platform structure.

Figure 4 shows a further modification of the platform structure.

Figure 5 is a side elevation view of a modification incorporating a telescopically collapsible frame carrying the platform, the platform being shown in the raised position in full lines and in the lowered position in broken lines.

Figure 6 is a rear perspective view of Figure 5 showing the platform in the lowered position, and Figure 7 shows in side elevation the apparatus of Figures 5 and 6 in the "folded-away" condition.

Referring to the drawings the chassis 1 supported by the road wheels 2 carries the truck floor 3 by the aid of intermediate transverse beams 4 and longitudinal beams 5.

In the embodiment shown in Figures 1, 2 and 3 the apparatus comprises a substantially U-shaped frame 6 having side limbs 6' which are inter-connected at their front ends by an integral transverse part 6a. The side limbs 6' are provided at their front end with slides in the form of upstanding apertured lugs or loops 7 which slide along two parallel guide rods or rails 8 arranged lengthwise of the chassis and inclined upwardly and forwardly, the rear ends of the guide rods 8 being fixed to the transverse portion 1a of the chassis frame 1, and the front ends (not shown) are fixed to one of the transverse beams 4 of the truck body.

To afford a wide span for the load carrying end of the frame 6 its side limbs 6' are bowed symmetrically outwards as at 6d about midway between their ends, the resultant wider trailing end parts 6e of the frame having formed integral therewith rectangular side struts constituted by two upper bars 6b and uprights 6c forming with the side parts 6e triangulated side wings. The upper bars 6b have secured across them substantially the full width of the floor 3 a plate 9 serving as a load carrying platform. For the sake of clearness this plate 9 has been omitted in Figure 2.

Across the rear end of the frame 6 is secured a transverse shaft 10 on which are journalled pivot lugs 11' of two arms 11 formed in rearwardly directed prolongation of the frame 6 and which are integral with forwardly directed arms 12 so that each combined pair of arms 11 and 12 form a lever of the first order. The arms 12 are bridged at their free ends by a transverse bar 13 the ends of which abut against the aforesaid pair of upper bars 6b and the frame 6 so as to restrict the angular movement of the levers 11, 12, as shown in Figure 2.

Secured across the frame 6 at the junction therewith of the uprights 6c is a shaft 14 carrying a freely rotating sheave 15 over which is guided a hoisting cable 16 fixed at one end to the transverse bar 13, and is carried over a further sheave 17 to a winch drum 16a which can be manually or power operated to wind in the cable for raising the frame 6 from the position shown in Figure 2 to the position shown in Figure 1. For hand operation a crank 16b can be provided together with any suitable means for securing it against unintentional rotation.

The sheave 17 can be mounted on a shaft between the rear ends of the beams 5.

Under the lifting tension of the cable 16 the transverse bar 13 is held hard against the parts 6e of the frame 6 whereby the arms 11 are held at an obtuse angle with the platform as shown in Figure 1 to act as a stop for loads pushed on to the platform 9 from the vehicle body, or to act as load retaining stops when a load is being lifted to the level of the floor 3.

When the frame is lowered to the position shown in Figures 2 and 3 with the free end of the frame resting on the ground, the pull in the wire 16 caused by the weight of the frame and platform will disappear and the arms 11 swing downwardly about the shaft 10 until the transverse bar 13 abuts against the upper bars 6b when the arms 11, which are heavier than the arms 12, will rest upon the road surface ready to receive a load as shown in Figures 2 and 3. When the load is a drum T it will be seen by reference to Figure 3 how easy it is to move the load on to the arms 11.

Upon commencing to wind in the cable 16 in order to raise the load the transverse bar 13 will be drawn downwards until it abuts against the frame 6 and this results in the arms 11 co-operating with the platform 9 to maintain the load on the platform as shown in broken lines in Figure 3. Hence the load T will seat firmly between the arms 11 and platform 9 until the platform 9 is brought into its uppermost position coplanar with the floor 4, when the load can be rolled easily on to the floor 4.

By providing enough slack on the cable 16 at the appropriate time, the frame 6 and platform 9 can be pushed in the direction of the arrow (Figure 1) out of the way under the vehicle floor 4, the guide rods 8 and slides 7 enabling this folding away of the platform 6 to be effected. A hook 10' can be provided on the chassis 1 to engage over the shaft 14 or other convenient part of the frame 6 to secure it in the folded away position.

Instead of making the arms 11 and 12 integral they can be separate elements 11a and 12a as shown in Figures 3a and 3b, so that the arms 11a can be foldable forwardly over the arms 12 to facilitate stowing the frame under the vehicle body. The pivoted ends of the arms 11 can be bifurcated as at 11b and the adjacent ends of the arms 12 formed as lugs 12b pivoted between the furcations 11b and having lateral stops 12c to abut against the furcations 11b when the apparatus is in use. This will reduce the amount the frame is to be pushed forward to the stowed away position.

In the embodiment illustrated in Figure 4 instead of providing the relatively fixed side parts 6b and 6c with the frame 6 so that the bars 6b act as stops for limiting the upward movement of the arms 12, the arms 12 carry two stop bars 13a and 13a' which abut against the upper and lower sides respectively of the frame 6 to limit the swinging movement of the levers 11, 12 relative to the frame 6, the two abutment bars being carried by depending legs 12a of the bars 12 which intersect the side members of the frame 6, the cable 16 in this arrangement being anchored to the upper bar 13a so that the tension on the cable 16 as the load raising operation commences applies a positive downward pull to the said load carrying support constituted by the arms 12 until the transverse bar 13a abuts against the frame 6. By this means, the arms 11 which before the lifting operation were engaged flush with the ground, are now urged positively upwards so as to reduce the angle between them and the frame 6, although in this arrangement the angle between the bars 11 and the platform 9 which is carried by the bars 12 is fixed.

It will be understood that the parts 11 and 12 of the embodiments shown in Figure 4 can be foldable relative to each other in the same manner as shown in Figures 3a and 3b.

In the embodiments so far described the frame 6 is pivotally connected to the frame 1 by the two slides 7 slidable on the guides 8 and is suspended at a third point by the cable 16. However, as an alternative, two cables 16 can be carried over pairs of sheaves 15 and 17 on either side of the longitudinal centre line of the vehicle and the front parts of the side limbs of the frame 6 converged triangular-fashion to carry at their junction a single slide 7 sliding along one longitudinal centre guide rod 8.

In the embodiment shown in Figures 5, 6 and 7 two side brackets 18 are fixed to and depend from the rear end of the chassis 1 and have journalled in their lower ends a transverse shaft 19 carrying a swinging frame of the loading and unloading apparatus. This frame comprises two longitudinal outer tubes 20 fixed by lugs 20' to the shaft 19 and receiving telescopically inner tubes or rods 21 carrying at their rear ends the load receiving support hereinafter described. The tubes 20 are preferably bridged at their front ends by a transverse strut 20a (see Figure 5).

To raise the rear ends of the swinging frame the cable 16 is connected to a cross bar 23 secured in the apices of two inverted V-shaped brackets 22 fixed to the parts of the tube in rear of the transverse shaft 19.

The reason for making the swinging frame telescopic is to be able to reduce the effective length of the swinging frame by pushing the rods 21 fully home in the tubes 20 for stowing away the load carrying support, and in order to limit the movement of the inner tubes or rods 21 within the outer tubes 20, the forward ends of the tubes 20 are increased in bore diameter as at 20b (see Figure 5) to receive pistons or annular abutments 21a on the inner ends of the rods 21, air escape and inlet holes being provided in the tubes communicating with both ends of the bores 20b.

The outer, i. e. rear, ends of the rods 21 have rigidly fixed to them relatively perpendicularly posts 24 from the upper ends of which is pivotally suspended a load carrier or platform comprising an upper platform plate 26 spanning two substantially triangular side plates 26a disposed outside the posts 24. A pivot shaft or co-axial pair of bolts 25 passed through the upper front corners of the side plates 26a connect the platform pivotally to the said posts 24.

When the platform is in the raised position with the plate 26 co-planar with the floor 3 of the vehicle it is maintained in rigid relationship with the rods 21 by reason of the front ends of the rods 21 which project through the posts 24, abutting against a transverse stop plate 27 fixed across the side plates 26a of the platform.

When the frame constituted by the parallel tubes 20 with their telescopic rods 21 is swung downwards to the broken line position shown in Figure 5, the platform by reason of its changing its centre of gravity will assume such a position that the lower edges of the side plates 26a will rest upon the ground with the stop plate 27 clear of the front ends of the rods 21.

A pair of parallel arms 29, corresponding to the arms 11 of the previously described embodiment are pivoted by lugs 29' at their front ends to a rod 28 secured across the apices of the side plates 26a. These arms 29 are adapted to change their angular relationship with the platform plate 26 in the same manner as the arms 11 in relation to the platform plate 9, and this effect is achieved by forming the aforesaid lugs 29' as collars and connecting to them near their peripheries by pivot pins 29a the rear ends of a pair of push-rods 30 which are guided through slots in a transverse guide member 31 and also in the stop plate 27 to engage the posts 24. It will be apparent that the push-rods 30 will be displaced relative to the support 26 in conformity with the relative displacement between the support 26 and the posts 24, and this results in the arms 29 becoming aligned with the lower edges of the side plates 26a and resting upon the ground in the lowermost position of the support 26, the weight of the support 26 as it changes its centre of gravity due to the raising of the support above the ground urging the rods 30 forwardly to reduce the angular relationship thereof with the platform 26 so as to afford a positive stop against the load rolling off the platform 26 during raising of the load.

As will be easily understood the arms 11 (Figures 1–4) and 29 (Figures 5–7) may be replaced by a single plate having about the same width as the platform 9 or 26.

When the apparatus is not in use it can be stowed away beneath the floor 3 by turning the platform upside down about the pivot 25 as shown in Figure 7 and pressing the rods 21 home in the tubes 20, the arms 29 folding close against the platform plate 26. This operation is effected with the tubes 20 substantially parallel with the chassis 1.

We claim:

1. Loading apparatus for use on goods transporting road vehicles comprising a frame, means to articulate the frame to the vehicle body beneath the load receiving part of the body, a load receiving support carried by said frame and movable by upward and downward swinging of the frame relative to the vehicle body into alignment with the load receiving part of the vehicle and also with the ground, a driver connected to said frame to control the said upward and downward swinging movement of the frame, said load receiving support incorporating an inner load receiving section and an outer load receiving section angularly related, the inner load receiving section being brought into close proximity and in substantially linear prolongation of the load receiving part of the vehicle when the said support is raised fully, and the other section being brought into substantially co-planar relationship with the ground when the load support is fully lowered, and means operated automatically by the initiation of the frame-raising-drive to said driver applying a positive tilt to the said outer section relatively to the said inner section and the ground to displace the load on the outer section towards the inner section and to reduce the angle between said two sections to afford abutment means to prevent unintentional rolling of the load off the support immediately at the commencement of and during the whole of the lifting period of the load.

2. Loading apparatus for use on goods transporting road vehicles comprising beneath the rear part of the vehicle body a longitudinally disposed frame pivoted adjacent its front end beneath the body, a load receiving support carried by the rear end of the frame, a load receiving platform part on said support, which said part, in the fully raised position of the frame, is close against and substantially co-planar with the floor of the vehicle so that loads can be transferred across said platform and the vehicle floor and in the fully lowered position of the frame is located at its end remote from the vehicle close to the ground whilst inclining from its said end upwardly from the ground, a further load receiving part extending outwardly from said end of said support to serve as additional load supporting means adapted in the lowermost position of the frame to extend beyond the support substantially flush upon the ground to enable loads to be placed thereon and removed therefrom at ground level, pivot means pivotally supporting the said additional load supporting means at its inner end where it joins the said platform so that such additional load supporting means is angularly displaceable relatively to the platform, means producing automatically and positively a reduction in angular relationship of said additional load supporting means with the said platform upon the raising of the load from the ground and maintaining such reduced angular relationship until the frame returns to its lowermost position in order that pending the arrival of the load receiving support back to ground level the said additional load supporting means will act as a stop against rearward displacement of the load from the platform, means when the load receiving support arrives at ground level automatically restoring the wider angular relationship which brings the additional load supporting means flush upon the ground and driving means carried by the vehicle to control the raising and lowering of the frame.

3. Apparatus according to claim 2 wherein the said frame is a substantially rectangular structure pivoted at the inner end by side limbs thereof to the vehicle body and has pivoted to its other end as a prolongation thereof the said additional load supporting means.

4. Apparatus according to claim 2 wherein the said frame in its uppermost position is inclined upwardly and rearwardly and in its lowermost position is inclined downwardly and rearwardly and it carries at its end projecting rearwardly beyond the vehicle body said platform which is co-planar with the floor of the vehicle in the uppermost position of the frame and is inclined upwardly and forwardly in relation to the ground level in the lowermost position of the frame, the said additional load supporting means comprising a lever arm fulcrumed to the rear end of the frame, and means transmitting from the said driving means an upward tilting load to the lever arm relative to said platform when the driving means is brought into operation to raise the frame and maintaining said lever arm at a fixed obtuse angle relative to the platform during raising and lowering of the load.

5. Apparatus according to claim 4 wherein said platform is at a fixed angular relationship with the said frame, and the said additional load supporting lever arm provides a lost-motion connection between the frame and the said driving means resulting in the frame-raising initiating operation of the driving means tilting the said additional load supporting lever arm upwardly relative to the frame in advance of the raising of the frame from its lowermost position.

6. Apparatus according to claim 5 wherein said additional load supporting lever arm has a normally relatively fixed forward extension to which is anchored one end of a flexible pull member, winding means to which the other end of the pull-member is connected, fixed stops between which said forward extension operates, said fixed stops being carried by the frame and one limiting the tilt applied to the additional load supporting lever arm by the traction of said flexible pull member during raising of the frame, and the other of which limits the gravitational downward movement of said additional load support or arm into the load receiving position when the frame moves into its lowermost position.

7. Apparatus according to claim 5 wherein said lever arm is foldable on to the platform when out of use.

8. Loading apparatus for use on goods transporting road vehicles comprising beneath the rear part of the vehicle body a longitudinally disposed frame pivoted at its front end beneath the body, a load receiving support carried by the rear end of the frame, a load receiving platform part on said support, which said part, in the fully raised position of the frame, is close against and substantially co-planar with the floor of the vehicle so that loads can be transferred across said platform and the vehicle floor, a further load receiving part extending rearwardly from said support to serve as additional load supporting means adapted in the lowermost position of the frame to extend rearwardly of the frame flush upon the ground to enable loads to be placed thereon and removed therefrom at ground level, means pivotally connecting said additional load supporting means to the frame so that such means is angularly displaceable relatively to the frame, means producing automatically a reduction in angular relationship of said additional load supporting means with the frame upon the raising of the load from the ground and maintaining such angular relationship until the frame returns to its lowermost position in order that the said additional load supporting means will act as a stop against rearward displacement of the load from the platform, driving means carried by the vehicle to control the raising and lowering of the frame, longitudinal guiding means beneath the vehicle floor, slide means pivotally connecting the frame to said guiding means whereby the frame is displaceable translatively along the vehicle to retract the load supporting means of the frame underneath the vehicle floor.

9. Loading apparatus for use on goods transporting road vehicles comprising beneath the rear part of the vehicle body a longitudinally disposed U shaped frame pivoted at its front end beneath the body, a load receiving support carried by the rear end of the frame, a load receiving platform part on said support, which said part, in the fully raised position of the frame, is close against and substantially co-planar with the floor of the vehicle so that loads can be transferred across said platform and the vehicle floor, a further load receiving part extending rearwardly from said support to serve as additional load supporting means adapted in the lowermost position of the frame to extend rearwardly of the frame flush upon the ground to enable loads to be placed thereon and removed therefrom at ground level, means pivotally connecting said additional load supporting means to the frame so that such means is angularly displaceable relatively to the frame, means producing automatically a reduction in angular relationship of said additional load supporting means with the frame upon the raising of the load from the ground and maintaining such angular relationship until the frame returns to its lowermost position in order that the said additional load supporting means will act as a stop against rearward displacement of the load from the platform, driving means carried by the vehicle to control the raising and lowering of the frame, upward extensions integral with the side limbs of the U shaped frame forming triangulated free end parts of said limbs, a forward extension on said additional load supporting means forming with said means a lever of the first order, an abutment projecting fixedly from said extension and displaceable by angular movement of said extension between said triangulated parts to limit tilt applied to said additional load supporting means.

10. Loading apparatus for use on goods transporting road vehicles comprising beneath the rear part of the vehicle body a longitudinally disposed U shaped frame pivoted at its front end beneath the body, a load receiving support carried by the rear end of the frame, a load receiving platform part on said support, which said part, in the fully raised position of the frame, is close against and substantially coplanar with the floor of the vehicle so that loads can be transferred across said platform and the vehicle floor, a further load receiving part extending rearwardly from said support to serve as additional load supporting means adapted in the lowermost position of the frame to extend rearwardly of the frame flush upon the ground to enable loads to be placed thereon and removed therefrom at ground level, means pivotally connecting said additional load supporting means to the frame so that such means is angularly displaceable relatively to the frame, means producing automatically a reduction in angular relationship of said additional load supporting means with the frame upon the raising of the load from the ground and maintaining such angular relationship until the frame returns to its lowermost position in order that the said additional load supporting means will act as a stop against rearward displacement of the load from the platform, and driving means carried by the vehicle to control the raising and lowering of the frame, a forward extension on said additional load supporting means forming with said means a lever of the first order, a pull-line, a guide on the frame for the pull-line, and a further guide carried by the vehicle body above the frame, the said pull-line being anchored above said first mentioned guide to the said forward extension and returned upwardly from said first-mentioned guide to the said driving means via said further guide so that lifting tension on the pull-line positively tilts upwardly the said additional load supporting means when the lifting of the frame commences.

11. Loading apparatus for use on goods transporting road vehicles comprising beneath the rear part of the vehicle body a longitudinally disposed frame pivoted at its front end beneath the body, a load receiving support carried by the rear end of the frame, a load receiving platform part on said support, which said part, in the fully raised position of the frame, is close against and substantially co-planar with the floor of the vehicle so that loads can be transferred across said platform and the vehicle floor, a further load receiving part extending rearwardly from said support to serve as additional load supporting means adapted in the lowermost position of the frame to extend rearwardly of the frame flush upon the ground to enable loads to be placed thereon and removed therefrom at ground level, means pivotally connecting said additional load supporting means to the frame so that such means is angularly displaceable relatively to the frame, means producing automatically a reduction in angular relationship of said additional load supporting means with the frame upon the raising of the load from the ground and maintaining such angular relationship until the frame returns to its lowermost position in order that the said additional load supporting means will act as a stop against rearward displacement of the load from the platform, and driving means carried by the vehicle to control the raising and lowering of the frame, said frame being composed of telescopic side members pivoted to the vehicle body beneath the floor to allow the load receiving support to be slid by collapse of the telescopic side members beneath the rear end of the vehicle floor, said load receiving support when in use extending rearwardly of, but being reversibly connected to the telescopic side members so as to be foldable forwardly relative to the telescopic side members to reduce the fore and aft dimension of the apparatus when stowing it beneath the vehicle floor.

12. Loading apparatus for use on goods transporting road vehicles comprising beneath the rear part of the vehicle body a longitudinally disposed frame pivoted at its front end beneath the body, a load receiving support carried by the rear end of the frame, a load receiving platform part on said support, which said part, in the fully raised position of the frame, is close against and substantially co-planar with the floor of the vehicle so that loads can be transferred across said platform and the vehicle floor, a further load receiving part extending rearwardly from said support to serve as additional load supporting means adapted in the lowermost position of the frame to extend rearwardly of the frame flush upon the ground to enable loads to be placed thereon and removed therefrom at ground level, means pivotally connecting said additional load supporting means to the frame so that such means is angularly displaceable relatively to the frame, means producing automatically a reduction in angular relationship of said additional load supporting means with the frame upon the raising of the load from the ground and maintaining such angular relationship until the frame returns to its lowermost position in order that the said additional load supporting means will act as a stop against rearward displacement of the load from the platform, and driving means carried by the vehicle to control the raising and lowering of the frame, said frame being composed of telescopic side members pivoted to the vehicle body beneath the floor to allow the load receiving support to be slid by collapse of the telescopic side members beneath the rear end of the vehicle floor, said telescopic side members comprising two spaced parallel tubes and rods slidable therein, said tubes being fixedly connected together and fulcrumed between their ends on transverse supporting means carried by the vehicle, a relatively fixed upward extension carried by said tubes, a pull line connected at one end to said upward extension and at its other end to said driving means for raising and lowering the tubes about their fulcrum axis, said rods slidable in the tubes extending rearwardly therefrom and carrying at their rear ends the load receiving support.

13. Apparatus according to claim 12 wherein the load receiving support is a platform adapted to be raised into substantially co-planar relationship with the vehicle floor, and having pivoted thereto a rearwardly extending additional load supporting means which receives the load at ground level, said platform being pivoted freely to upstanding supporting members fixed to the rear ends of said rods, the said additional load supporting means being tilted positively upwardly relative to the platform by the connection thereto of means transferring the effort due to the gravitational force of the platform about its pivotal support to the said additional load supporting means.

14. Apparatus according to claim 13 wherein a push-rod at one end is connected off-centre to a rotary relatively fixed part of the said additional load supporting means and abuts at its other end against an abutment connected relatively fixedly to said rods slidable within said tubes so that the tilt of the platform relatively to the said rods during lifting of the platform reacts to displace the push-rod rearwardly to tilt the additional load supporting means upwardly relatively to the platform.

References Cited in the file of this patent

UNITED STATES PATENTS

| Number | Name | Date |
|---|---|---|
| 1,520,175 | Collins | Dec. 23, 1924 |
| 1,630,473 | Ducondu | May 31, 1927 |
| 1,878,995 | Abbe | Sept. 27, 1932 |
| 2,033,243 | Jester | Mar. 10, 1936 |
| 2,410,567 | Christiansen | Nov. 5, 1946 |
| 2,421,566 | Kober | June 3, 1947 |
| 2,589,654 | Archer | Mar. 18, 1952 |

FOREIGN PATENTS

| Number | Country | Date |
|---|---|---|
| 348,249 | Germany | Feb. 4, 1922 |
| 571,580 | France | Feb. 6, 1924 |
| 113,577 | Australia | Aug. 14, 1941 |
| 256,991 | Switzerland | May 4, 1946 |